(12) United States Patent
Trejo

(10) Patent No.: US 9,895,930 B2
(45) Date of Patent: Feb. 20, 2018

(54) COMPRESSION JAW SUPPORT

(71) Applicant: Javier Trejo, Odessa, TX (US)

(72) Inventor: Javier Trejo, Odessa, TX (US)

(*) Notice: Subject to any disclaimer, the term of this patent is extended or adjusted under 35 U.S.C. 154(b) by 467 days.

(21) Appl. No.: 14/633,143

(22) Filed: Feb. 27, 2015

(65) Prior Publication Data

US 2016/0250891 A1    Sep. 1, 2016

(51) Int. Cl.
*B66F 3/08* (2006.01)
*B60B 30/08* (2006.01)
*F16M 11/28* (2006.01)

(52) U.S. Cl.
CPC ............. *B60B 30/08* (2013.01); *F16M 11/28* (2013.01)

(58) Field of Classification Search
CPC ...... B66F 3/24; B66F 5/00; B66F 5/04; B66F 1/00
See application file for complete search history.

(56) References Cited

U.S. PATENT DOCUMENTS

| | | | |
|---|---|---|---|
| 2,516,483 A * | 7/1950 | Parker ...................... | B66F 3/16 254/133 R |
| 8,201,807 B2 * | 6/2012 | Hernandez, Jr. .......... | B66F 3/30 254/133 R |
| 2009/0200528 A1 * | 8/2009 | Seber ........................ | B66F 1/06 254/131 |
| 2016/0250891 A1 * | 9/2016 | Trejo ..................... | F16M 11/28 29/402.08 |

* cited by examiner

*Primary Examiner* — Lee D Wilson
(74) *Attorney, Agent, or Firm* — Warren V. Norred; Norred Law, PLLC

(57) ABSTRACT

The invention is a car jack that uses a threaded ring to raise a jack, and then a compressing nut that compresses opposing jaws to hold a vehicle axle in place as a car tire is replaced.

3 Claims, 2 Drawing Sheets

COMPRESSION JAW SUPPORT

TECHNICAL FIELD OF THE INVENTION

The field of the invention concerns mounting jacks for horizontal pipes and structures.

BACKGROUND OF THE INVENTION

Mechanics in all industries often have a need to mount a pipe or other physical element in place that is difficult to secure. Piping, axles, and other round parts are particularly difficult as they have no edge on which a jack can catch.

In a mechanic's shop, vises are used for this purpose. Typically, a vise is mounted permanently on a solid structure, such as a work bench, or in a mobile mechanic, a truck's work box or bed. These tend to be very solid devices, but not portable enough for use under a car or to hold an axle in place.

A similar problem occurs for jacks that are used to raise a car. In previous decades, many cars were designed to handle industry standard jacks that fit into bumpers of vehicles. As vehicles have become constructed in different ways, the trend is for a manufacturer to have a jack that fits specifically into a set of mounting holes or in a very specific place under the car, and almost no other place can be considered safe, as the vehicles are constructed to handle the weight of the car in that one mounting position.

Floor jacks of many types are available from third parties. Most floor jacks have a several-inch-wide mounting platform that a user places under the axle on the side of the car that has a flat tire. In lifting the vehicle using the flat platform of a floor jack, however, a danger exists that the axle can slide to one side of the jack's mounting platform, which can damage the vehicle or any individual close to or under the to vehicle.

Other jacks have a simple telescoping hydraulic platform that can fit into any place under the car where a user can find a solid location. These locations might be at the back side of a wheel hub, such that any lift on the jack directly lifts the tire, or on the axle itself, sometimes with an intermediary device to keep the axle from sliding off, such as a small piece of wood that allows for the weight of the axle to sit more firmly on the jack.

The mechanic industry and automotive vehicle operators would benefit from a jack that is constructed to lift the side of a vehicle that has a way of connecting with a vehicle and securely lifting it, while at the same time minimizing slippage and danger to both vehicle and operator.

SUMMARY OF THE INVENTION

The present invention is a car jack that comprises a tripod-support, a lifting element, and on the lifting element, a pair of angled surfaces which are compressed by the rotation of an oversized nut on the outside part of the angled surfaces.

Other features and advantages of the present disclosure will be apparent to those of ordinary skill in the art upon reference to the following detailed description.

DETAILED DESCRIPTION OF THE INVENTION

While the making and using of various embodiments of the present disclosure are discussed in detail below, it should be appreciated that the present disclosure provides many applicable inventive concepts, which can be embodied in a wide variety of specific contexts. The disclosure is primarily described and illustrated hereinafter in conjunction with various embodiments of the presently-described systems and methods. The specific embodiments discussed herein are, however, merely illustrative of specific ways to make and use the disclosure and do not limit the scope of the disclosure.

DETAILED DESCRIPTION OF THE INVENTION

The disclosed jack is designed to sit behind a wheel and lift the side of the vehicle by lifting the axle on that side. To ensure that the axle does not become dislodged during the process or while it is raised, the axle is situated between two angled surfaces which form a V-shaped opening that prevents movement to either side, and in which the axle is held in place both by the weight of the vehicle which drives the axle to the center between the angled surfaces, and by the compression of the angled surfaces once the axle is in place.

The embodiment of the invention described herein includes the following components:

Support 100—Though the current embodiment uses a folding tripod as foundational structure of the invention, the invention could also use a solid base, or a hydraulic lifting platform found on large floor jacks. The Support 100 simple provides a solid connection with the floor, providing a stable foundation for the rest of the invention.

Threaded Ring 200—As currently embodied and shown on the drawings, the lift element is a Threaded Ring 200 mounted rotatably on top of the Support 100, so as a user rotates it, a threaded rod (the Shaft 300) is lifted or lowered through the internal threads of the Ring 200 and Support 100.

Shaft 300—is a threaded rod which is lifted or lowered by movement of the Threaded Ring 200. On top of the Shaft 300 is the V-shaped Compressible Jaw Assembly 400.

Compressible Jaw 400—is a section of threaded rod cut in the top and slightly separated, as shown on the drawings. On top of each separated half-rod is are angled surfaces which face each other and form a V-shaped opening. In the current embodiment, the threaded rod of the Shaft 300 and the threaded rod used to form the Jaw are the same diameter. The Jaw 400 is constructed by cutting the top of the Shaft 300 down its axis, slightly bending the resulting halves apart, and then welding or otherwise affixing the surfaces to the divided rod halves.

Jaw Mounting 450—An optional construction allows the Jaws 400 to be screwed into place on top of the separated halves of the two tops of the Shaft 300, so they can be replaced by unscrewing each section of Jaw 400 from a mounting stud.

Compressing Nut 500—is a threaded nut with the same thread pitch as the threaded rod of the Compressible Jaw 400, but slightly wider diameter, so that, as it is turned onto the lower threads of the widened Jaw's threads, it compresses the opposing angled surfaces.

Figure 1:
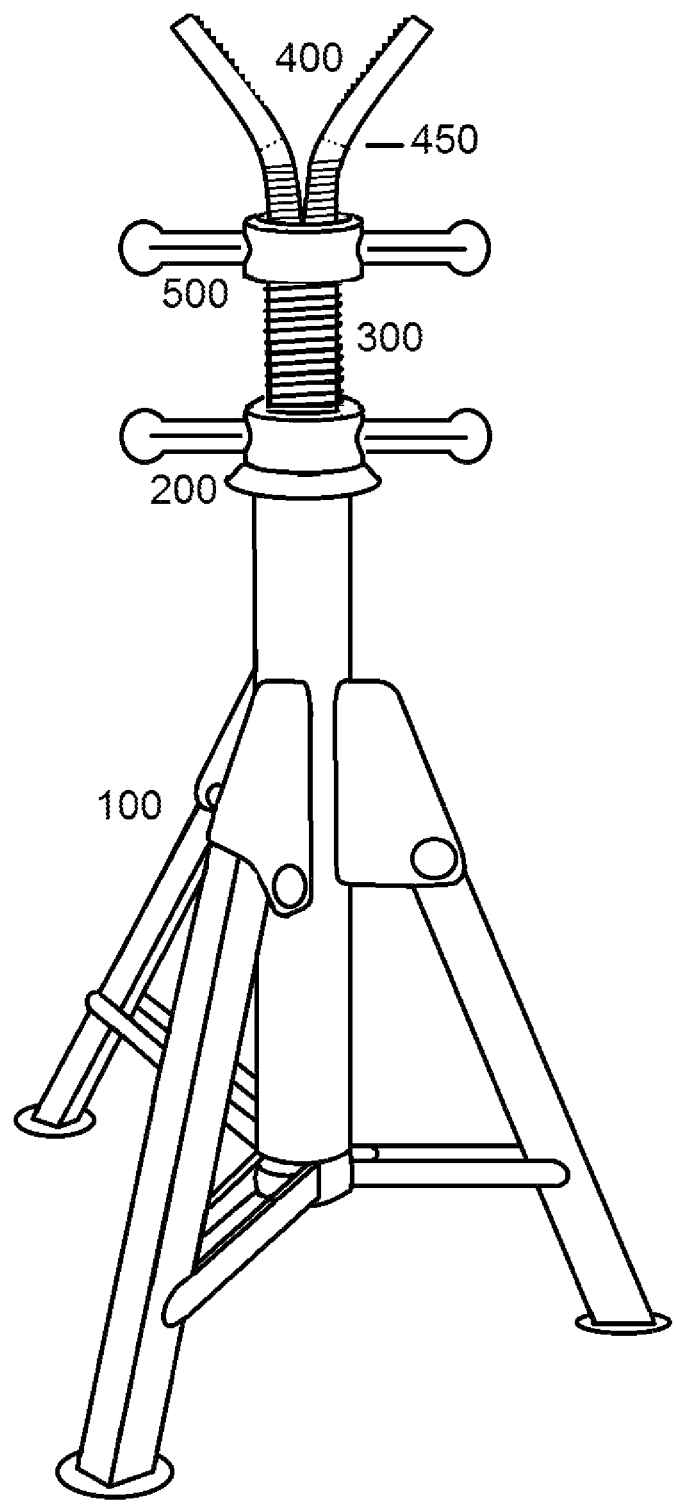
FIG. 1 is an orthogonal view of the invention.
Figure 2:
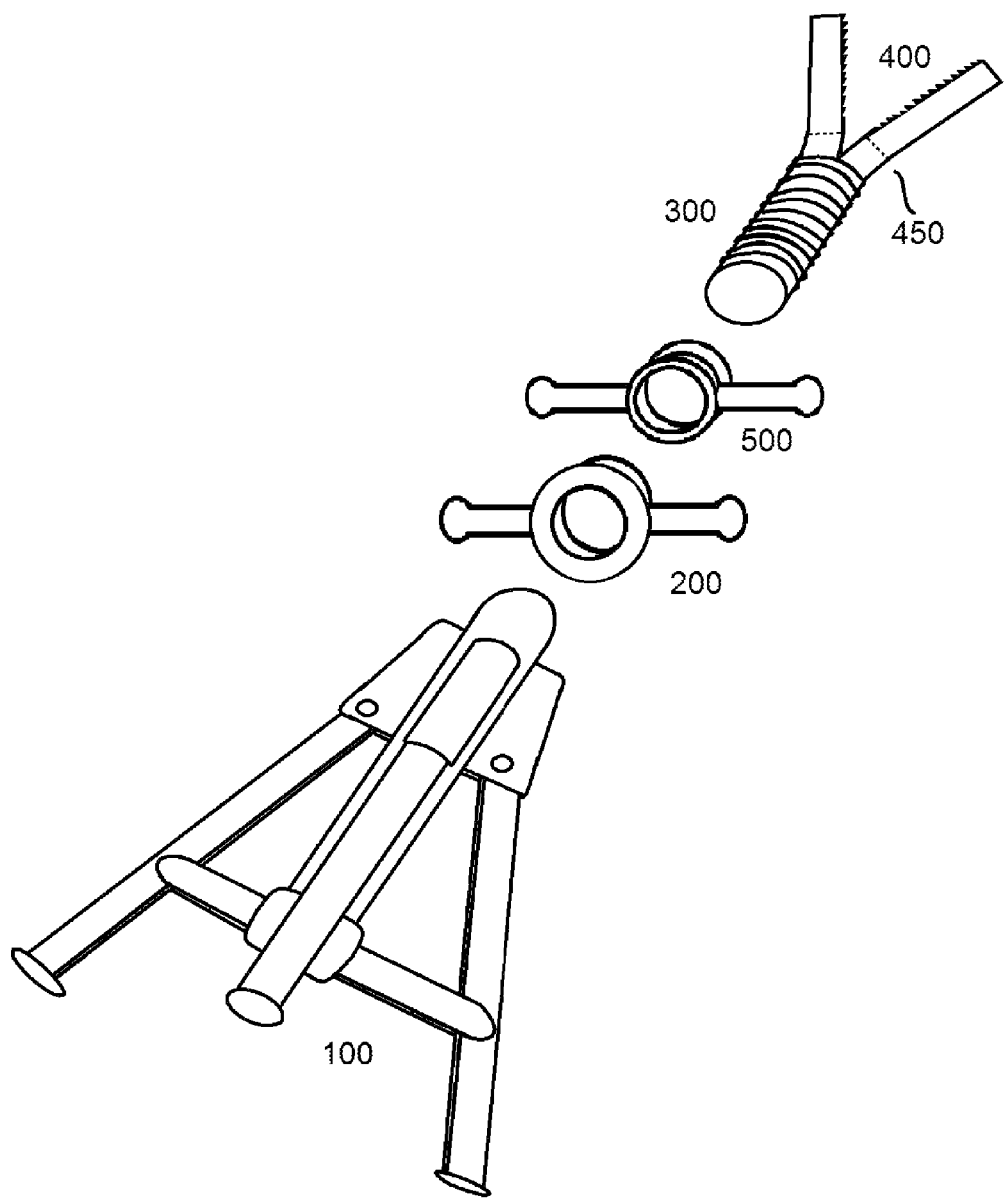
FIG. 2 is an exploded view of the invention.

As described above and shown in FIG. 1, the invention can be placed under a vehicle's axle, which will generally be a good mounting position that is easy to identify. The user can lift the car by a) placing the invention's Support 100 directly under the car's axle, b) ensuring that the axle is centered in the Jaw 400, c) raising the Jaw 400 by turning the Threaded Ring 200 until it is snug to the axle, d) rotating the Compressing Nut 500 upward on the Jaw's threads until the axle is firmly held in place in the Jaw 400, and then e) continuing to lift the vehicle's axle until the tire is suitably off the ground and may be changed, f) changing the tire, and then g) reversing the process to remove the invention.

While the invention has been illustrated and described in details in the drawings and foregoing description, the same is to be considered as illustrative and not restrictive in character, it being understood that only certain embodiments have been shown and described and that all equivalents, changes, and modifications that come within the spirit of the inventions as described herein and by the following claims are desired to be protected. As already discussed, the Support 100 element could be a hydraulic lift cylinder with a wide base, or any other lifting element. The Jaws 400 could be of varying diameters and jaw angles to reflect the expected axle diameter. Modifications of this nature are intended to be within the invention as disclosed.

The inventor claims:

1. A car jack, comprising:
  a) a Support that firmly holds the jack in place on the ground and holds the rest of the device upright;
  b) a Threaded Ring mounted rotably on top of the Support, constructed to sit at the top of the Support and, as a user rotates the Threaded Ring, a matching threaded Shaft is lifted or lowered through the Ring and Support;
  c) a Shaft constructed of a threaded rod which is lifted or lowered by movement of the Threaded Ring;
  d) a Compressible Jaw constructed from a section of threaded rod, with a cut extending down from the top along the rod's central axis, and the two resulting half-rods bended slightly separated, with opposing angled surfaces set on top of each separated half-rod so they form a V-shaped opening;
  e) a Compressing Nut that has the same thread pitch as the threaded rod of the Compressible Jaw, but with a slightly wider internal diameter than the threaded rod from which the Compressible Jaw was made, is a threaded nut with the same thread pitch as the threaded rod of the Compressible Jaw 400, but slightly wider diameter, so that, as the Compressing Nut is turned onto the threads of the widened Jaw's threads, it compresses the opposing angled surfaces of the Jaw as it rotates upward toward the opposing or allows more space between the Jaws as it is rotated downward.

2. The car jack of claim 1, further comprising a means of removing and replacing the Jaw halves.

3. The car jack of claim 2, in which the means of removing and replacing the Jaw halves is by use of a stud mounted on the separated halves of the Shaft.

* * * * *